(12) United States Patent
Shi

(10) Patent No.: US 11,993,948 B1
(45) Date of Patent: May 28, 2024

(54) PET SWIMMING POOL

(71) Applicant: Dongguan Hongyu Plastic Co., Ltd., Guangdong (CN)

(72) Inventor: Juying Shi, Guangdong (CN)

(73) Assignee: Dongguan Hongyu Plastic Co., Ltd., Guangdong (CN)

( * ) Notice: Subject to any disclaimer, the term of this patent is extended or adjusted under 35 U.S.C. 154(b) by 0 days.

(21) Appl. No.: 18/373,486

(22) Filed: Sep. 27, 2023

(30) Foreign Application Priority Data

Aug. 17, 2023 (CN) .......................... 202322228841.5

(51) Int. Cl.
| | | |
|---|---|---|
| *E04H 4/12* | (2006.01) | |
| *E04H 4/00* | (2006.01) | |
| *A01K 1/035* | (2006.01) | |
| *A01K 13/00* | (2006.01) | |

(52) U.S. Cl.
CPC ............. *E04H 4/12* (2013.01); *E04H 4/0043* (2013.01); *A01K 1/035* (2013.01); *A01K 13/001* (2013.01)

(58) Field of Classification Search
CPC .................. A01K 1/035; A01K 13/001; A47K 3/06–074; A61H 2201/0103; A61H 33/601; A61H 33/6021–6063; E04H 2004/0068; E04H 4/00; E04H 4/0018–0062; E04H 4/12
See application file for complete search history.

(56) References Cited

U.S. PATENT DOCUMENTS

| | | | | |
|---|---|---|---|---|
| 4,706,307 A | * | 11/1987 | Smith ................. | E02B 15/0885 4/487 |
| 7,797,770 B2 | * | 9/2010 | Lau ........................ | A61H 33/02 4/541.1 |
| 9,254,240 B2 | * | 2/2016 | Lin ......................... | A61H 33/02 |
| 10,087,644 B2 | * | 10/2018 | Lin ........................... | E04H 4/12 |
| 2007/0107117 A1 | * | 5/2007 | Casolco .................... | E04H 4/12 4/496 |
| 2022/0074219 A1 | * | 3/2022 | Huang .................. | F16L 11/081 |
| 2022/0339063 A1 | * | 10/2022 | Huang ..................... | A61H 1/00 |

* cited by examiner

*Primary Examiner* — David P Angwin
*Assistant Examiner* — Nicholas A Ros
(74) *Attorney, Agent, or Firm* — Cooper Legal Group, LLC

(57) ABSTRACT

The present application relates to the technical field of pet toy, and particularly to a pet swimming pool, including a pool bottom, an annular pool body, an annular spraying tube and an inlet tube; wherein the annular pool body includes an inner layer, an outer layer and a connection layer, a bottom of the outer layer is connected to an edge of the pool bottom, a bottom of the inner layer is connected to the pool bottom, a top of the outer layer is connected to a top of the inner layer by the connection layer, and a cavity that is enclosed is formed between the outer layer, the inner layer, the connection layer and the pool bottom; the annular spraying tube is provided at a side of the inner layer departing from the outer layer, and a plurality of spraying holes are formed on the annular spraying tube.

5 Claims, 5 Drawing Sheets

PET SWIMMING POOL

CROSS-REFERENCE TO RELATED APPLICATION

This application claims the priority to Chinese patent application No. 202322228841.5, filed on Aug. 17, 2023. The entirety of Chinese patent application No. 202322228841.5 is hereby incorporated by reference herein and made a part of this specification.

TECHNICAL FIELD

The present application relates to the technical field of pet toy, and particularly to a pet swimming pool.

BACKGROUND ART

A pet swimming pool is a product for pet to play, bathe and swim.

A pet swimming pool disclosed in a related art includes a pool bottom and an annular pool body fixed at an edge of the pool bottom. An inlet tube is mounted in the annular pool body, an inlet end of the inlet tube extends to the outside of the annular pool body from the bottom of the annular pool body, so that external faucet or water pump can supply water to the inlet tube. The water sprayed from the inlet tube is just inside the annular pool body, so that the pet in the pet swimming pool can play and bathe.

During realizing the present application, it is found that the above technical solution has at least the following defects, since the inlet tube is located in the pet swimming pool, which is prone to be touched and further be pressed when pet plays. The inlet tube is prone to be deformed and damaged during being pressed, such that the service life of the inlet tube is shortened, and the service life of the pet swimming pool is shortened as well.

SUMMARY

In order to extend the service life of a pet swimming pool, the present application provides a pet swimming pool.

The present application provides a pet swimming pool, adopting the following technical solution:

a pet swimming pool, including a pool bottom, an annular pool body, an annular spraying tube and an inlet tube; wherein the annular pool body includes an inner layer, an outer layer and a connection layer, a bottom of the outer layer is connected to an edge of the pool bottom, a bottom of the inner layer is connected to the pool bottom, a top of the outer layer is connected to a top of the inner layer by the connection layer, and a cavity that is enclosed is formed between the outer layer, the inner layer, the connection layer and the pool bottom; the annular spraying tube is provided at a side of the inner layer departing from the outer layer, and a plurality of spraying holes are formed on the annular spraying tube; and the inlet tube is located in the cavity, a first end of the inlet tube is in communication with exterior of the cavity, and a second end of the inlet tube is in communication with interior of the annular spraying tube.

In the above technical solution, the first end of the inlet tube passes through the bottom of the outer layer and is in communication with the exterior of the cavity, and the second end of the inlet tube passes through and is in communication with the interior of the annular spraying tube, so that the external water can be transported into the annular spraying tube through the inlet tube. The annular spraying tube is located at the top of the annular pool body, and the water in the annular spraying tube can be sprayed out through the plurality of the spraying holes, so that the pet can play and bathe in the water. Moreover, a cavity is formed between the outer layer, the inner layer, the connection layer and pool bottom, the inlet tube is located in the cavity, so that the inlet tube cannot be touched by the pet during playing, so as to protect the pet and protect the inlet tube as well, and extend the service life of the inlet tube and extend the service life of the pet swimming pool as well.

In an embodiment, the outer layer is provided with a connection assembly configured for connecting the first end of the inlet tube, the connection assembly includes an outer cylinder and an inner cylinder, and the outer cylinder passes through the outer layer; an outer side wall of a first end of the outer cylinder located outside the outer layer is fixed with a first convex ring, an end of the first convex ring abuts against an outer side wall of the outer layer, and the first convex ring is provided with an external thread; an outer side wall of a second end of the outer cylinder located in the cavity is fixed with a second convex ring, and an end of the second convex ring abuts against an inner side wall of the outer layer; and the inner cylinder is threadedly connected to an inner side wall of the outer cylinder, and an inlet end of the inlet tube is in communication with an interior of the inner cylinder.

In the above technical solution, since an end of the first convex ring abuts against the outer side wall of the outer layer, and an end of the second convex ring abuts against the inner side wall of the outer layer, the first convex ring and the second convex ring can clamp the outer layer, such that the outer cylinder is fixed on the outer layer. Since the arc-shaped surface of the first convex ring is provided with an external thread, a water tube can be connected with an outer side wall of the first convex ring via a threaded connection by the operator, thereby facilitating supplying the water into the inlet tube through the water tube. The inner cylinder is threadedly connected to the inner side wall of the outer cylinder, which increases the convenience for mounting and detaching the inner cylinder by the operator. An end of the inlet tube passes through the interior of the inner cylinder and is fixedly connected to the inner cylinder, which increases the convenience for mounting and detaching the inlet tube by the operator.

In an embodiment, an end of the inner cylinder is fixedly connected with a grip portion, a first through hole is formed in the grip portion, the inlet tube passes through the first through hole, and the inlet tube is fixedly connected to the grip portion.

In the above technical solution, the operator can rotate the inner cylinder by rotating the grip portion, which increases the convenience of rotating the inner cylinder by the operator. The inlet tube passes through the first through hole, and the inlet tube is fixedly connected to the grip portion, while the inlet tube is fixedly connected to the inner cylinder, which increases the connection strength between the inlet tube and the inner cylinder.

In an embodiment, the inner side wall of the outer layer is fixedly provided with a plurality of boards.

In the above technical solution, the plurality of boards can increase the whole structural strength of the annular pool body, so that the annular pool body is not prone to be deformed.

In an embodiment, the pet swimming pool further includes a buffering assembly provided in the cavity, wherein the buffering assembly includes a guide block formed with a second through hole, and the inlet tube passes through the second through hole.

In the above technical solution, when the pet strikes the inner layer of the pet swimming pool during playing, since the inlet tube is located inside the guide block, the inlet tube can be protected by the guide block, so that the inlet tube would not be deformed under external force.

In an embodiment, a first side of the guide block facing the outer layer is fixed with a first buffering pad, a second side of the guide block facing the inner layer is fixed with a second buffering pad, and the second buffering pad is fixedly connected to the inner layer.

In the above technical solution, when the guide block is pressed by the pet, the outer layer can be protected by the first buffering pad, thereby reducing pressure of the guide block on the outer layer and extending the service life of the outer layer; and the inner layer can be protected by the second buffering pad, thereby reducing pressure of the guide block on the inner layer and extending the service life of the inner layer.

In an embodiment, two limit sleeves are sleeved on the inlet tube, the two limit sleeves abut against two ends of the guide block, respectively; and the limit sleeves are threadedly connected with a machine screw, and an end of the machine screw abuts against a surface of the inlet tube.

In the above technical solution, the end of the machine screw and the limit sleeves have clamping effect on the inlet tube, so that the limit sleeves are fixed on the inlet tube. The two limit sleeves have limit effect to the guide block, so that the guide block cannot slide along a length direction of the inlet tube. Moreover, the operator can rotate the machine screw to release the clamping effect of the machine screw on the inlet tube, which is conductive to adjust the location of the limit sleeve along the length direction of the inlet tube and maintain the limit sleeve abutting against the end of the guide block.

In an embodiment, an end of the limit sleeve facing the guide block is fixed with an annular abutting block, and the annular abutting block abuts against an end of the guide block.

In the above technical solution, the annular abutting block increases a contacting area between the limit sleeve and the guide block, which increases the firmness of clamping the guide block by the two limit sleeves.

In an embodiment, an outer side wall of an end of the inlet tube facing the annular spraying tube is fixed with a connection ring, a side wall of the connection ring abuts against an inner side wall of the annular spraying tube, and the connection ring is fixedly connected to the inner side wall of the annular spraying tube.

In the above technical solution, the connection ring is fixedly connected to the inlet tube and the inner side wall of the annular spraying tube, so that the inlet tube is fixed inside the annular spraying tube, and the connection ring also increases tightness between the inlet tube and the annular spraying tube.

In an embodiment, the plurality of the spraying holes are uniformly arranged along a circumference direction.

In the above technical solution, the plurality of the spraying holes are uniformly arranged along the circumference direction, when the water is injected into the annular spraying tube through the inlet tube, the water in the annular spraying tube sprays from the plurality of the spraying holes, thereby increasing the overall aesthetics during spraying the water.

In summary, the present application can achieve at least one of the following beneficial technical effects:

1. the first end of the inlet tube passes through the bottom of the outer layer and is in communication with the exterior of the cavity, and the second end of the inlet tube passes through and is in communication with the interior of the annular spraying tube, so that the external water can be transported into the annular spraying tube by the inlet tube. The water in the annular spraying tube can be sprayed out through the plurality of the spraying holes, so that the pet can play and bathe in the water. Moreover, a cavity is formed between the outer layer, the inner layer, the connection layer and pool bottom, the inlet tube is located in the cavity, so that the inlet tube cannot be touched by the pet during playing, so as to protect the pet and protect the inlet tube as well, and extend the service life of the inlet tube and extend the service life of the pet swimming pool as well.
2. since an end of the first convex ring abuts against the outer side wall of the outer layer, and an end of the second convex ring abuts against the inner side wall of the outer layer, the first convex ring and the second convex ring can clamp the outer layer, such that the outer cylinder is fixed on the outer layer. Since the arc-shaped surface of the first convex ring is provided with an external thread, a water tube can be connected with an outer side wall of the first convex ring via a threaded connection by the operator, thereby facilitating supplying the water into the inlet tube through the water tube. The inner cylinder is threadedly connected to the inner side wall of the outer cylinder, which increases the convenience for mounting and detaching the inner cylinder by the operator. An end of the inlet tube passes through the interior of the inner cylinder and is fixedly connected to the inner cylinder, which increases the convenience for mounting and detaching the inlet tube by the operator.
3. The outer side wall of the grip portion is provided with a first circular chamfer, thereby reducing the pressure of the grip portion on the outer layer and extending the service life of the outer layer, and reducing the pressure of the grip portion on the inner layer as well, which extends the service life of the outer layer and the inner layer.

DETAILED DESCRIPTION

The present application will be further described in detail below in combination with FIGS. 1-6.

The terms used in the present application are only intended to describe specific embodiment, not to limit the present application. Unless otherwise defined, technical or scientific terms used in the present application should have the ordinary meaning understood by those skilled in the field to which the present application belongs. "first", "second" and similar terms used in the present application do not represent any sequence, quality or significance, and are only used for distinguishing different components.

Figure 1:
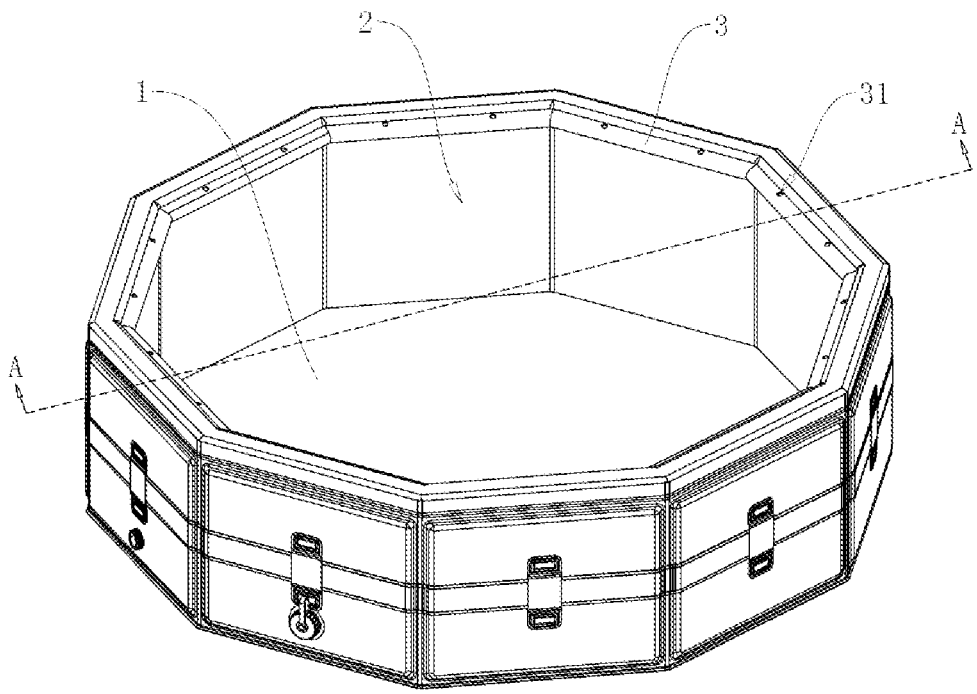
FIG. 1 is a schematic structural diagram of a pet swimming pool according to an embodiment of the present application.
Figure 2:
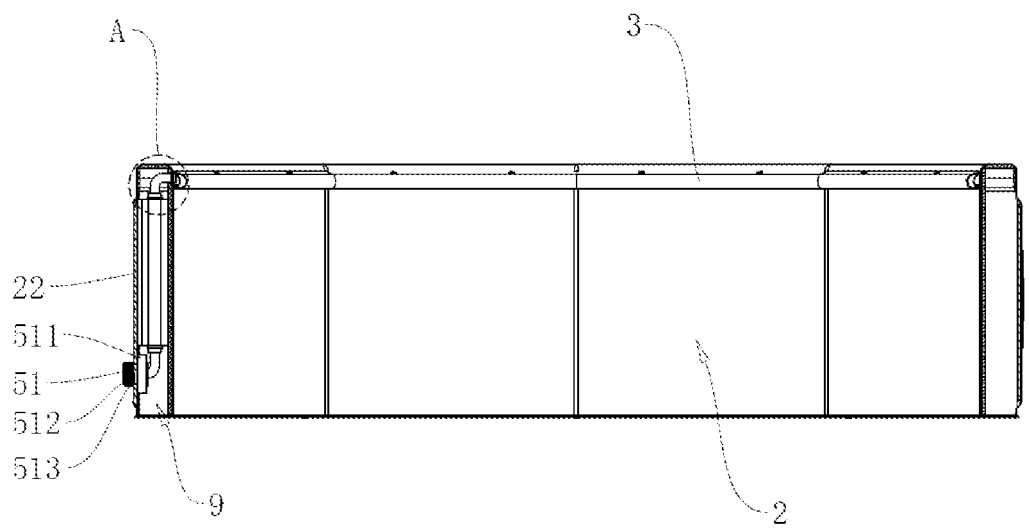
FIG. 2 is a semi-section schematic view of a pool bottom and an annular pool body taken along a line A-A according to an embodiment of the present application.

An embodiment of the present application discloses a pet swimming pool. Referring to FIGS. 1-2, the pet swimming pool includes a pool bottom 1, an annular pool body 2, an annular spraying tube 3 and an inlet tube 4. In this embodiment, when the pet swimming pool is in an opened state, a horizontal section of the annular pool body 2 is of a regular decagon shape. The bottom of the annular pool body 2 is fixedly connected with an upper surface of the pool bottom 1, and the annular spraying tube 3 is fixed to the top of the annular pool body 2. A plurality of spraying holes 31 are formed on the annular pool body 2, the plurality of spraying holes 31 are uniformly arranged along a circumference direction, and an angle between an axis of each spraying hole 31 and horizontal direction is 60°. The inlet tube 4 is located in the annular pool body 2, a first end of the inlet tube 4 penetrates an outer side wall of the annular pool body 2, and is fixedly connected to the outer side wall of the annular pool body 2, a second end of the inlet tube 4 penetrates the annular spraying tube 3 and is fixedly connected to the annular spraying tube 3. A cavity 9 that is enclosed is formed between the outer layer, the inner layer, the connection layer and the pool bottom. The first end of the inlet tube 4 is in communication with an exterior of the cavity 9, and the second end of the inlet tube 4 is in communication with an exterior of the annular spraying tube 3. The water is injected into the annular spraying tube 3 through the inlet tube 4, and the water in the annular spraying tube 3 can be sprayed out through the plurality of the spraying holes 31. The plurality of spraying holes 31 are uniformly arranged along a circumference direction, when the water is injected into the annular spraying tube 3 through the inlet tube 4, the water in the annular spraying tube 3 can be sprayed out from the plurality of spraying holes 31, which increases the overall aesthetics during spraying the water. Therefore, the pet can play and bathe in the sprayed water.

Figure 3:
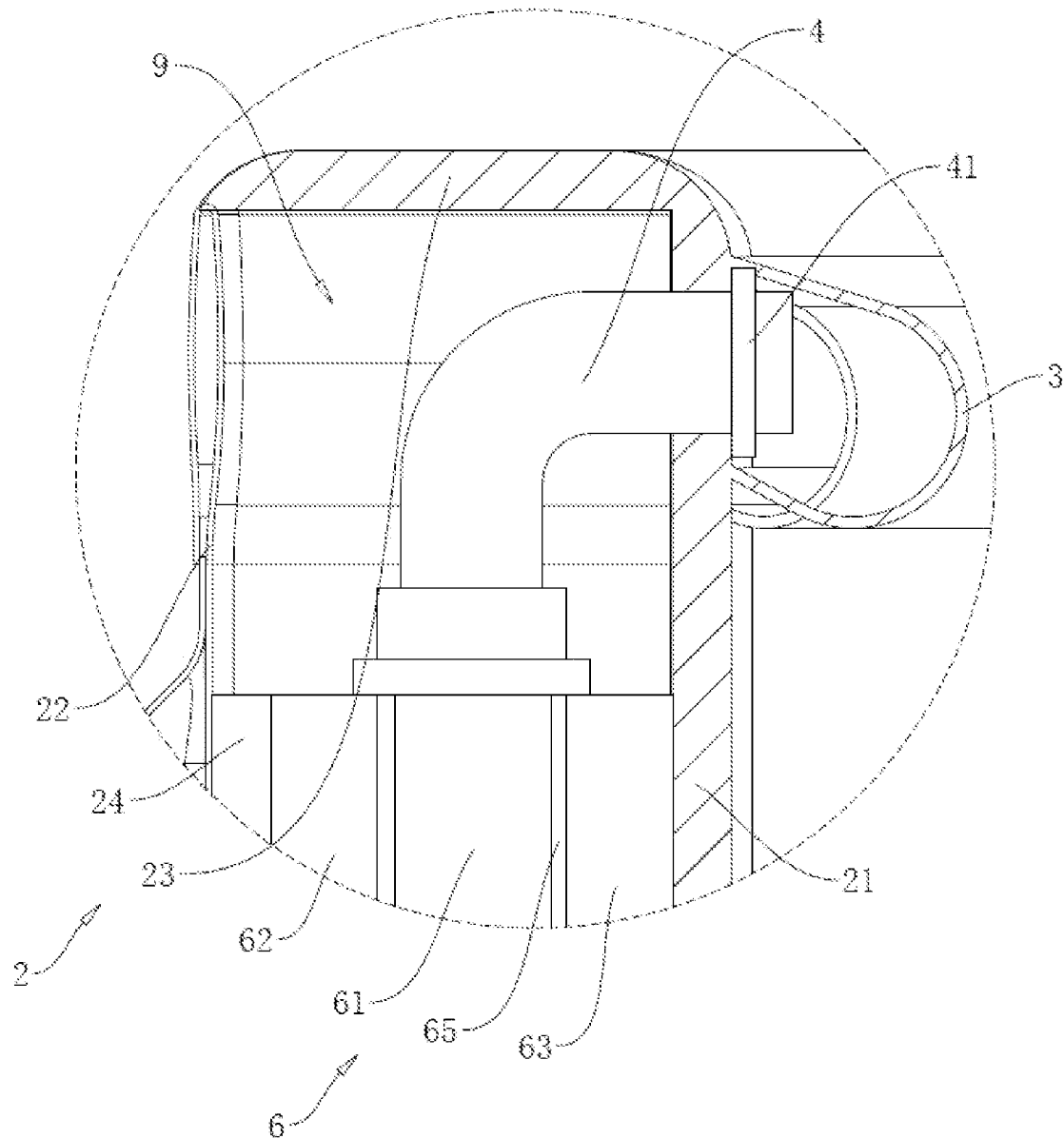
FIG. 3 is an enlarged schematic view of portion B in FIG. 2.

Referring to FIGS. 2-3, an outer side wall of an end of the inlet tube 4 facing the annular spraying tube 3 is fixedly provided with a connection ring 41, a side wall of the connection ring 41 abuts against an inner side wall of the annular spraying tube 3, and the connection ring 41 is fixedly connected to the inner side wall of the annular spraying tube 3. The connection ring 41 is fixedly connected to the inlet tube 4 and the inner side wall of the annular spraying tube 3, so that the inlet tube 4 is fixedly connected in the annular spraying tube 3, and the connection ring 41 also increases tightness between the inlet tube 4 and the annular spraying tube 3.

Figure 4:
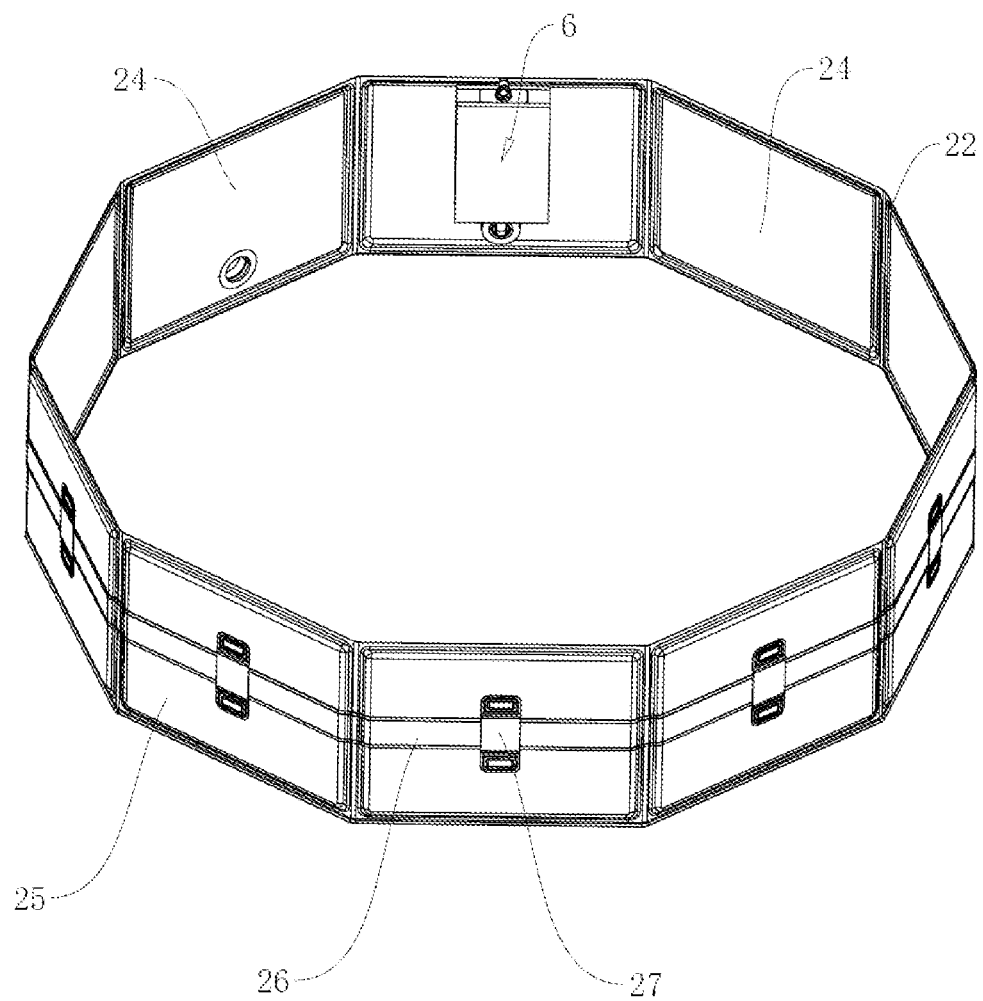
FIG. 4 is schematic structural diagram of an outer layer, a board, a protection cover, a binding strip and a limit snap-fit according to an embodiment of the present application.

Referring to FIGS. 3-4, the annular pool body 2 includes an inner layer 21, an outer layer 22 and a connection layer 23, a bottom of the outer layer 22 is connected to an edge of the pool bottom 1, a bottom of the inner layer 21 is fixedly connected to the pool bottom 1, a top of the outer layer 22 is fixedly connected to a top of the inner layer 21 by the connection layer 23, and a cavity 9 that is enclosed is formed between the outer layer 22, the inner layer 21, the connection layer 23 and pool bottom 1. The annular spraying tube 3 is fixed on an inner side wall of the inner layer 21. The inlet tube 4 is located in the cavity 9, an end of the inlet tube 4 departing from the annular spraying tube 3 penetrates the bottom of the outer layer 22 and is fixed with the outer layer 22. Since the cavity 9 is formed between the outer layer 22 and the inner layer 21, the connection layer 23 and pool bottom 1, the inlet tube 4 is located in the cavity 9, the inlet tube 4 cannot be touched by the pet during playing, so as to protect the pet and protect the inlet tube 4 as well, and extend the service life of the inlet tube 4 and extend the service life of the pet swimming pool as well.

Referring to FIG. 4, the inner side wall of the outer layer 22 is fixedly provided with a plurality of boards 24, and the plurality of boards 24 can increase the whole structural strength of the annular pool body 2, so that the annular pool body 2 is not prone to be deformed. A protection cover 25 is sleeved on the outer side wall of the outer layer 22, and a binding strip 26 is sleeved on an outer side wall of the protection cover 25. The outer side wall of the protection cover 25 is fixed with a plurality of limit snap-fits 27 arranged uniformly along a circumference direction. The binding strip 26 passes through the plurality of limit snap-fits 27 at the same time, and the plurality of limit snap-fits 27 are configured to limit and fix the binding strip 26.

Figure 5:
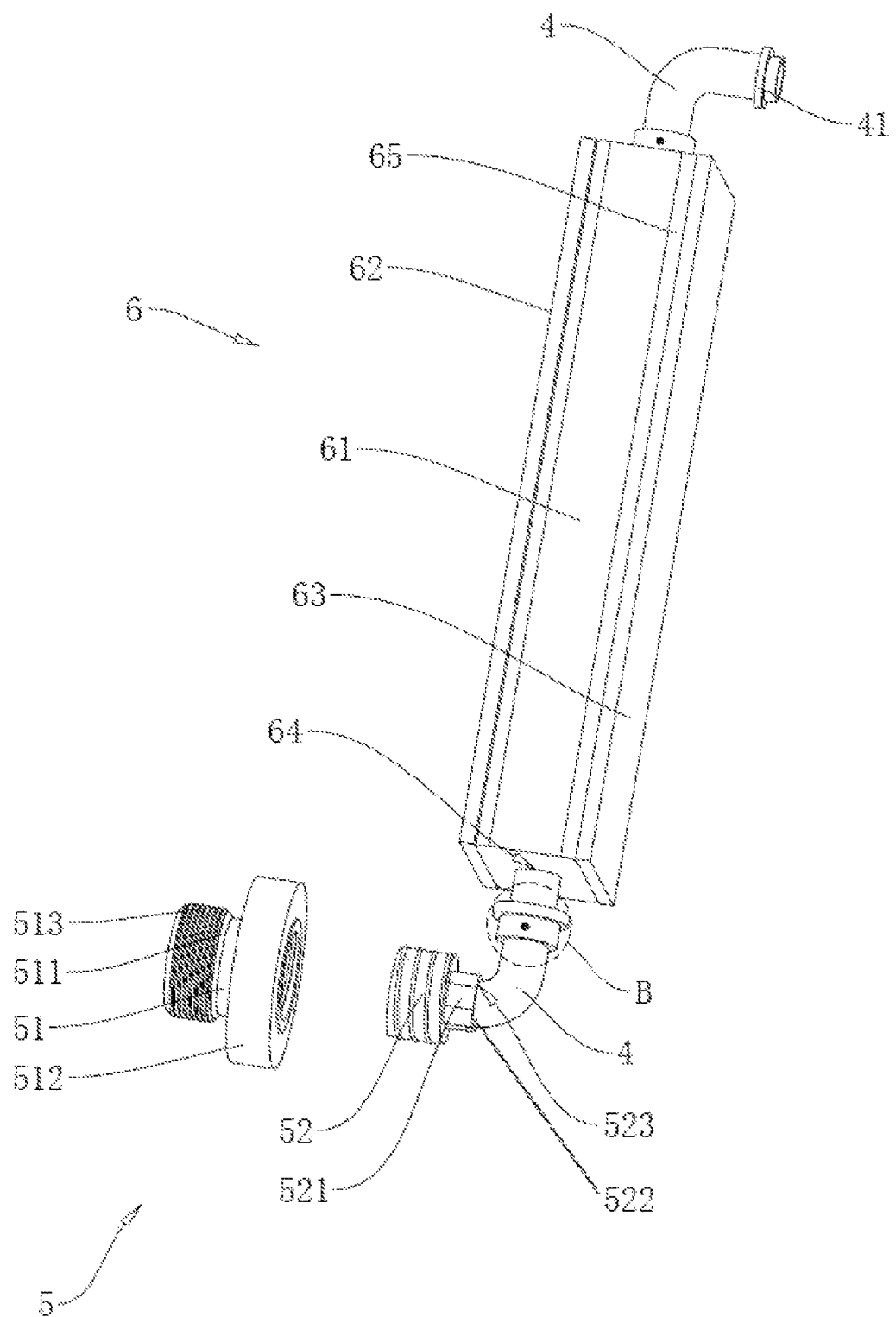
FIG. 5 is a schematic structural diagram of an inlet tube, a connection assembly and a buffering assembly according to an embodiment of the present application.

Referring to FIGS. 2 and 5, the outer layer 22 is provided with a connection assembly 5 configured for connecting the first end of the inlet tube 4. The connection assembly 5 includes an outer cylinder 51 and an inner cylinder 52, the outer cylinder 51 passes through the outer layer 22, an outer side wall of a first end of the outer cylinder 51 located outside the outer layer 22 is formed integrally with a first convex ring 511, an end of the first convex ring 511 abuts against an outer side wall of the outer layer 22, and an arc-shaped surface of the first convex ring 511 is provided with an external thread 513. A water tube can be connected with an outer side wall of the first convex ring via a threaded connection by the operator, thereby facilitating supplying the water to the inlet tube 4 through the water tube. An outer side wall of a second end of the outer cylinder 51 located in the cavity 9 is formed integrally with a second convex ring 512, and an end of the second convex ring 512 abuts against the inner side wall of the outer layer 22. Since an end of the first convex ring 511 abuts against the outer side wall of the outer layer 22, and an end of the second convex ring 512 abuts against the inner side wall of the outer layer 22, the first convex ring 511 and the second convex ring 512 can clamp the outer layer 22, such that the outer cylinder 51 is fixed on the outer layer 22. The inner cylinder 52 is threadedly connected to the inner side wall of the outer cylinder 51, and an end of the inlet tube 4 passes through the interior of the inner cylinder 52 and is fixedly connected to the inner cylinder 52. The inner cylinder 52 is threadedly connected to the inner side wall of the outer cylinder 51, which increases the convenience for mounting and detaching the inner cylinder 52 by the operator. An end of the inlet tube 4 passes through the interior of the inner cylinder 52 and is fixedly connected to the inner cylinder 52, which increases the convenience for mounting and detaching the inlet tube 4 by the operator.

Referring to FIG. 5, an end of the inner cylinder 52 is fixed with a grip portion 521, a first through hole 522 is formed in the grip portion 521, the inlet tube 4 passes through the first through hole 522, and the inlet tube 4 is fixedly connected to the grip portion 521. The operator can rotate the inner cylinder 52 by rotating the grip portion 521, which increases the convenience of rotating the inner cylinder 52 by the operator. The inlet tube 4 passes through the first through hole 522, and the inlet tube 4 is fixedly connected to the grip portion 521, while the inlet tube 4 is fixedly connected to the inner cylinder 52, which increases the connection strength between the inlet tube 4 and the inner cylinder 52.

Referring to FIG. 5 again, the outer side wall of the grip portion 521 is provided with a first circular chamfer 523. The first circular chamfer 523 provided on the outer side wall of the grip portion 521 can reduce the pressure of the grip portion 521 on the outer layer 22 and extend the service life of the outer layer 22, and reduce the pressure of the grip portion 521 on the inner layer 21 as well, which extends the service life of the outer layer 22 and the inner layer 21.

Referring to FIG. 5 again, a buffering assembly 6 is provided in the cavity 9, the buffering assembly 6 includes a guide block 61, a second through hole 64 is formed in the guide block 61, and the inlet tube 4 passes through the second through hole 64. When the pet strikes the inner layer 21 of the pet swimming pool during playing, since the inlet tube 4 is located inside the guide block 61, the inlet tube 4 can be protected by the guide block 61, so that the inlet tube 4 would not be deformed under external force.

Figure 6:
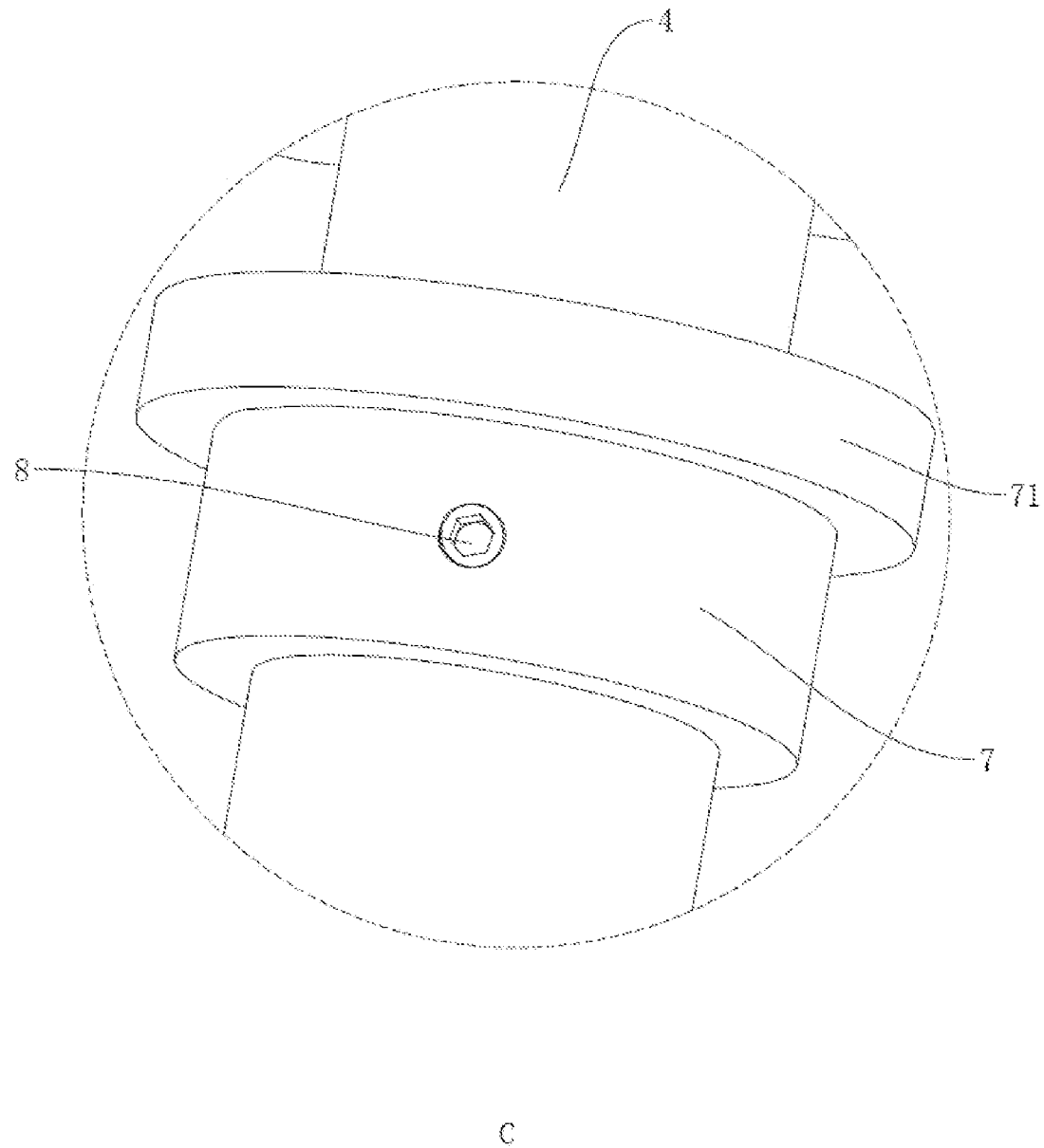
FIG. 6 is an enlarged schematic view of portion C in FIG. 5.

Referring to FIGS. 5-6, two limit sleeves 7 are sleeved on the inlet tube 4, the two limit sleeves 7 abut against two ends of the guide block 61, respectively. The limit sleeves 7 are threadedly connected with a machine screw 8, and an end of the machine screw 8 abuts against a surface of the inlet tube 4. The end of the machine screw 8 and the limit sleeves 7 have clamping effect on the inlet tube 4, so that the limit sleeves 7 are fixed on the inlet tube 4. The two limit sleeves 7 have limit effect to the guide block 61, so that the guide block 61 cannot slide along a length direction of the inlet tube 4. Moreover, the operator can rotate the machine screw 8 to release the clamping effect of the machine screw 8 on the inlet tube 4, which is conductive to adjust the location of the limit sleeve 7 along the length direction of the inlet tube 4 and maintain the limit sleeve 7 abutting against the end of the guide block 61.

Referring to FIG. 6, an end of the limit sleeve 7 facing the guide block 61 is fixed with an annular abutting block 71, and the annular abutting block 71 abuts against an end of the guide block 61. The annular abutting block 71 increases a contacting area between the limit sleeve 7 and the guide block 61, which increases the firmness of clamping the guide block 61 by the two limit sleeves 7.

Referring to FIGS. 3 and 5, a first side of the guide block 61 facing the outer layer 22 is fixed with a first buffering pad 62, a second side of the guide block 61 facing the inner layer 21 is fixed with a second buffering pad 63, and the second buffering pad 63 is fixedly connected to the inner layer 21. When the guide block 61 is pressed by the pet, the outer layer 22 can be protected by the first buffering pad 62, thereby reducing pressure of the guide block 61 on the outer layer 22 and extending the service life of the outer layer 22. The inner layer 21 can be protected by second buffering pad 63, thereby reducing pressure of the guide block 61 on the inner layer 21 and extending the service life of the inner layer 21.

Referring to FIG. 5, the guide block 61 is provided with a second circular chamfer 65, by which the pressure of the guide block 61 on the first buffering pad 62 can be reduced, and the pressure of the guide block 61 on the second buffering pad 63 can be reduced at the same time, so that the first buffering pad 62 and the second buffering pad 63 are protected.

The implementation principle for above embodiment of the present application is as follows. The first end of the inlet tube 4 passes through the outer layer 22 and is fixedly connected to the outer layer 22, and the second end of the inlet tube 4 passes through the interior of the annular spraying tube 3 and is fixedly connected to the annular spraying tube 3, so that the external water can be transported into the annular spraying tube 3 through the inlet tube 4, the water in the annular spraying tube 3 can be sprayed out through the plurality of the spraying holes 31, so that the pet can play and bathe in the water. Moreover, a cavity 9 is formed between the outer layer 22, the inner layer 21, the connection layer 23 and pool bottom 1, the inlet tube 4 is located in the cavity 9, the inlet tube 4 cannot be touched by the pet during playing, so as to protect the pet and protect the inlet tube 4, and extend the service life of the inlet tube 4 and extend the service life of the pet swimming pool as well.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS 1. pool bottom;
2. annular pool body;
21. inner layer;
22. outer layer;
23. connection layer;
24. board;
25. protection cover;
26. binding strip;
27. limit snap-fit;
3. annular spraying tube;
31. spraying hole;
4. inlet tube;
41. connection ring;
5. connection assembly;
51. outer cylinder;
511. first convex ring;
512. second convex ring;
513. external thread;
52. inner cylinder;
521. grip portion;
522. first through hole;
523. first circular chamfer;
6. buffering assembly;
61. guide block;
62. first buffering pad;
63. second buffering pad;
64. second through hole;
65. second circular chamfer;
7. limit sleeve;
71. annular abutting block;
8. machine screw;
9. cavity.

What is claimed is:

1. A pet swimming pool, comprising a pool bottom, an annular pool body, an annular spraying tube and an inlet tube; wherein the annular pool body comprises an inner layer, an outer layer and a connection layer, a bottom of the outer layer is connected to an edge of the pool bottom, a bottom of the inner layer is connected to the pool bottom, a top of the outer layer is connected to a top of the inner layer by the connection layer, a cavity that is enclosed is formed between the outer layer, the inner layer, the connection layer and the pool bottom, the annular spraying tube is provided at a side of the inner layer away from the outer layer, a plurality of spraying holes are formed on the annular spraying tube, the inlet tube is located in the cavity, a first end of the inlet tube is in communication with the cavity, a second end of the inlet tube is in communication with the annular spraying tube, the pet swimming pool further comprises a buffering assembly provided in the cavity, the buffering assembly comprises a guide block formed with a through hole, the inlet tube passes through the through hole, a first side of the guide block facing the outer layer is fixed with a first buffering pad, a second side of the guide block facing the inner layer is fixed with a second buffering pad, and the second buffering pad is fixedly connected to the inner layer.

2. The pet swimming pool according to claim 1, wherein an outer side wall of the second end of the inlet tube is fixed with a connection ring, a side wall of the connection ring abuts against an inner side wall of the annular spraying tube, and the connection ring is fixedly connected to the inner side wall of the annular spraying tube.

3. The pet swimming pool according to claim 1, wherein the plurality of spraying holes are uniformly arranged along a circumference direction.

4. The pet swimming pool according to claim 1, wherein two limit sleeves are sleeved on the inlet tube, the two limit sleeves abut against two ends of the guide block, respectively, each of the two limit sleeves is threadedly connected with a machine screw, and an end of the machine screw abuts against a surface of the inlet tube.

5. The pet swimming pool according to claim 4, wherein an end of each of the two limit sleeves facing the guide block is fixed with an annular abutting block, and the annular abutting block abuts against an end of the guide block.

* * * * *